(12) United States Patent
Nayak et al.

(10) Patent No.: US 12,483,378 B2
(45) Date of Patent: Nov. 25, 2025

(54) TRANSCEIVER DEVICES WITH TRANSMITTER AND RECEIVER FREQUENCY CONTROL

(71) Applicant: Synopsys, Inc., Mountain View, CA (US)

(72) Inventors: Gopal Krishna Ullal Nayak, Bengaluru (IN); Sanket Sanjay Naik, Pune (IN); Ankit Somani, Pune (IN); Biman Chattopadhyay, Bengaluru (IN); Ravi Jitendra Mehta, Bangalore (IN); Sujoy Chakravarty, Pune (IN); Ameer Muhammad Youssef, Mississauga (CA); Ayal S. Shoval, Toronto (CA); John T. Stonick, Portland, OR (US); Michael W. Lynch, Toronto (CA); Adam Ross Burns, Ontario (CA)

(73) Assignee: Synopsys, Inc., Sunnyvale, CA (US)

( * ) Notice: Subject to any disclaimer, the term of this patent is extended or adjusted under 35 U.S.C. 154(b) by 476 days.

(21) Appl. No.: 17/980,824

(22) Filed: Nov. 4, 2022

(65) Prior Publication Data
US 2023/0141608 A1 May 11, 2023

(30) Foreign Application Priority Data
Nov. 5, 2021 (IN) .............................. 202141050741

(51) Int. Cl.
*H04L 7/00* (2006.01)
*H03L 7/06* (2006.01)

(52) U.S. Cl.
CPC .............. *H04L 7/0012* (2013.01); *H03L 7/06* (2013.01)

(58) Field of Classification Search
CPC ................................ H04L 7/0012; H03L 7/06
See application file for complete search history.

(56) References Cited

U.S. PATENT DOCUMENTS 7,738,617 B1 * 6/2010 Fortin ..................... H04L 7/033
375/373
9,264,219 B1 * 2/2016 Kang ..................... H03L 7/093

* cited by examiner

*Primary Examiner* — Duc C Ho
(74) *Attorney, Agent, or Firm* — Patterson + Sheridan, LLP

(57) ABSTRACT

A re-timer device includes transceiver circuitry. The transceiver circuitry includes clock generation circuitry and first receiver circuitry. The clock generation circuitry generates a first clock signal. The first receiver circuitry receives the first clock signal and a first input signal. The first receiver circuitry generates a first frequency offset value based on the first input signal and the first clock signal. The first input signal has a first frequency and the first clock signal has a second frequency different than the first frequency. The first receiver circuitry outputs the first frequency offset value.

20 Claims, 6 Drawing Sheets

400

| | 340 - Status | 322 - Status | 380 - Status | 362 - Status |
|---|---|---|---|---|
| 410 | Locked | Locked | Locked | Disabled |
| 420 | Locked | Locked | Locked – fcode not transferred from 310 | Disabled |
| 430 | Locked | Locked | Locked – fcode transferred from 310 | Disabled |
| 440 | Locked – fcode not transferred from 350 | Locked | Locked – fcode transferred from 310 | Locked |
| 450 | Locked – fcode transferred from 350 | Locked | Locked – fcode transferred from 310 | Locked |

402

| | 322 - fcode | 380 - fcode | 362 - fcode | 340 - fcode |
|---|---|---|---|---|
| 410 | 0 | 0 | 0 | 0 |
| 420 | F1-F3 | 0 | 0 | 0 |
| 430 | F1-F3 | F3-F1 | 0 | 0 |
| 440 | F1-F3 | F3-F1 | F2-F1 | 0 |
| 450 | F1-F3 | F3-F1 | F2-F1 | F3-F2 |

404

| | 322 - Freq | 380 - Freq | 362 - Freq | 340 - Freq |
|---|---|---|---|---|
| 410 | F3 | F3 | F3 | F3 |
| 420 | F1 | F3 | F3 | F3 |
| 430 | F1 | F1 | F1 | F3 |
| 440 | F1 | F1 | F2 | F3 |
| 450 | F1 | F1 | F2 | F2 |

FIG. 4

TRANSCEIVER DEVICES WITH TRANSMITTER AND RECEIVER FREQUENCY CONTROL

RELATED APPLICATION

This application claims the benefit of Indian provisional patent application serial number 202141050741, filed Nov. 5, 2021, which is hereby incorporated herein by reference.

TECHNICAL FIELD

The present disclosure relates to controlling the frequencies of clock signals within transceiver devices of communication systems.

BACKGROUND

Communication systems use re-timer devices to mitigate signal degradation as the signal travels through the corresponding communication channel and devices (e.g., printed circuit boards (PCBs), connectors, and/or cables). Signal degradation distorts the signal, and can cause the corresponding communication system to fail the associated compliance testing, and reduce the operability of the corresponding communication system. A re-timer device includes clock a data recover (CDR) circuitry that mitigates interference, jitter, crosstalk, and reflections within the corresponding communication system. A re-timer device may include one or more transceiver devices that use data rate matching between received and transmitted data to communicate data from a host to an end device.

SUMMARY

In one example, transceiver circuitry includes clock generation circuitry and first receiver circuitry. The clock generation circuitry generates a first clock signal. The first receiver circuitry receives the first clock signal and a first input signal. The first receiver circuitry generates a first frequency offset value based on the first input signal and the first clock signal. The first input signal has a first frequency and the first clock signal has a second frequency different than the first frequency. The first receiver circuitry outputs the first frequency offset value.

In one example, a re-timer device includes first transceiver circuitry that generates a first clock signal. The first transceiver circuitry further generates a first frequency offset value based on a first input signal and the first clock signal. The first input signal has a first frequency and the first clock signal has a second frequency different than the first frequency. Further, the first transceiver circuitry outputs the first frequency offset value. The re-timer device further includes second transceiver circuitry. The second transceiver circuitry receives the first frequency offset value. The second transceiver circuitry outputs a first output signal based on the first frequency offset value and the first input signal.

In one example, a method includes generating a first clock signal, and receiving a first input signal. Further, the method includes generating, via first transceiver circuitry, a first frequency offset value based on the first input signal and the first clock signal. The first input signal has a first frequency and the first clock signal has a second frequency different than the first frequency. The method further includes outputting the first frequency offset value.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 4 illustrates the status, fcodes, and frequency of elements of a re-timer device during different states.

DETAILED DESCRIPTION

Figure 1:
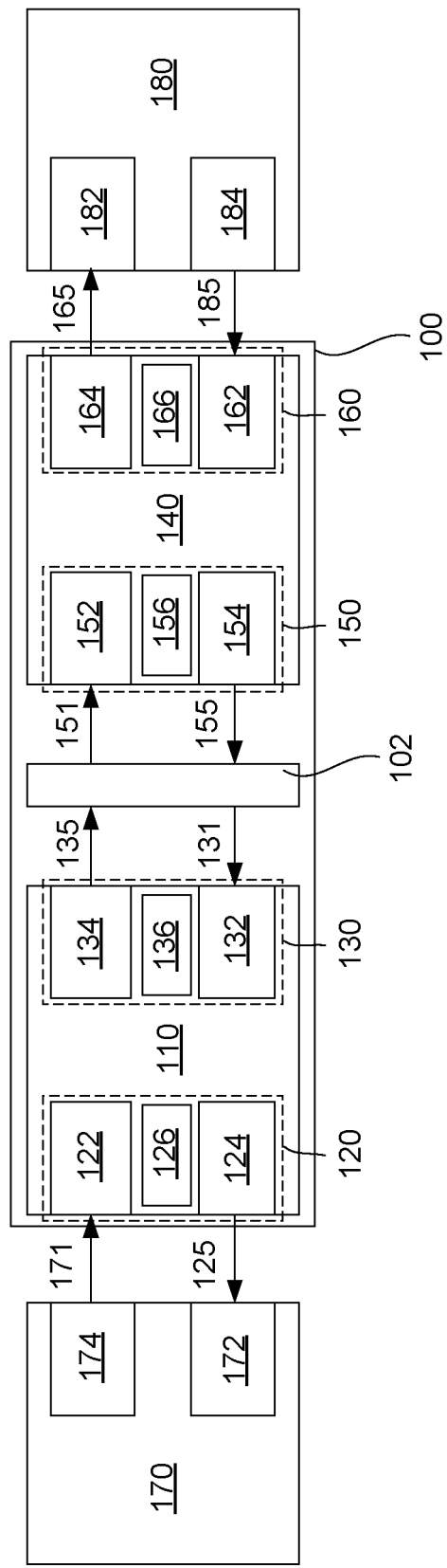
FIG. 1 illustrates a block diagram of a communication system.

Aspects of the present disclosure relate to transceiver devices with transmitter and receiver frequency control.

In communication systems, signal degradation may occur due to due interference, e.g., signal jitter, signal crosstalk, and/or signal reflections. As the distance the signals travel within a communication system increases, the signal degradation also increases. To mitigate the signal degradation, communication systems utilize re-timer devices. Re-timer devices are placed within the signal path, and mitigate signal degradation by receiving a signal having interference (e.g., signal degradation) and outputting a signal in which the interference has been at least partially mitigated. In one example, re-timer devices extract a clock signal imbedded within a received signal, recover the data within the signal, and transmit an output signal based on the data and extracted clock signal. The output signal is a cleaned up version (e.g., a version with mitigated interference) of the received signal.

A re-timer device includes first and second transceiver circuitries. The first transceiver circuitry is host facing transceiver circuitry (e.g., transmits and receives signals to and from the host device) and the second transceiver circuitry is end device facing transceiver circuitry (e.g., transmits and receives signals to and from the end device). Further, the first and second transceiver circuitries transmit and receive signals with each other. Each transceiver circuitry includes transmitter circuitry and receiver circuitry. Each transceiver circuitry further includes clock generation circuitry that generates a clock signal for each respective transmitter circuitry and receiver circuitry. The clock signal is shared by the transmitter circuitry and receiver circuitry of the respective transceiver circuitry.

In some instances, to mitigate errors that may occur between the host facing and end device facing transceiver circuitries, signals received and transmitted by the host facing transceiver circuitry are rate matched (e.g., frequency matched) with the signals received and transmitted by the end device facing transceiver circuitries. The clock generation circuitries of each of the transceiver circuitries use compensation mechanisms to adjust the frequency of the transmitted and received signals to mitigate errors within the corresponding re-timer device. In one example, the clock generation circuitries use clock forwarding techniques to communicate data between the transceiver circuitries. However, in clock forwarding techniques the clock frequency may be disturbed due to the loss of the clock signal frequency lock.

Technical advantages of the present disclosure include, but are not limited to, a clock and data recovery scheme for a re-timer device that uses a two-step process for clock frequency (e.g., rate) matching between transceiver circuitries. The two-step process uses a setup phase to determine frequency codes (fcodes) communicated between the transceiver circuitries for clock frequency matching within the corresponding clock generation circuitries, and a track phase that controls the updating of the frequency codes during operation of the transceiver circuitries. The use of a two-step process as described herein reduces data transmission errors by improving the clock frequency lock between transceiver devices.

FIG. 1 illustrates a communication device 100 that transmits and receives data between a host device 170 and an end device 180. The communication device 100 includes re-timer devices 110 and 140. The re-timer devices 110 and 140 may be Ethernet re-timer devices. In other examples, other types of re-timer devices may be used. Further, the re-timer devices 110 and 140 may be included within a computer system (e.g., the computer system 600 of FIG. 6). In one example, the re-timer devices 110 and/or 140 are included within a network interface device of a computer system (e.g., network interface device 608 of FIG. 6).

The host device 170 includes receiver circuitry 172 and transmitter circuitry 174 for transmitting signals from the host device 170 and receiving signals transmitted to the host device 170. In one example the host device 170 is a computer system (e.g., the computer system 600 of FIG. 602). Further, the end device 180 includes receiver circuitry 182 and transmitter circuitry 184 for transmitting from the end device 180 and receiving signal transmitted to the end device 180. In one example the end device 180 is a computer system (e.g., the computer system 600 of FIG. 602).

The re-timer device 110 receives and transmit signals with the host device 170. Accordingly, the re-timer device 110 is referred to as a host facing re-timer device. The re-timer device 110 receives the signal 171 from the host device 170, and generates and transmits the signal 135 from the received signal 171. For example, as will be described in greater detail in the following, the re-timer device 110 uses a two phase technique to extract a clock signal imbedded within the signal 171, recover the data within the signal 171, and transmit the signal 135 based on the data and the extracted clock signal. The signal 135 has reduced interference as compared to the signal 171. The signal 135 is output to the channel 102. The channel 102 includes one or more wires, printed circuit boards (PCBs), and other circuit devices that provide a communication path between the re-timer devices 110 and 140. Further, the re-timer device 110 receives the signal 131 from the channel 102, and uses a two phase technique as described in greater detail in the following to generate the signal 125 from the signal 131. The signal 125 is transmitted to the host device 170.

The re-timer device 110 includes transceiver circuitry 120 and transceiver circuitry 130. The transceiver circuitry 120 includes receiver circuitry 122, transmitter circuitry 124, and clock generation circuitry 126. The transceiver circuitry 130 includes receiver circuitry 132, transmitter circuitry 134, and clock generation circuitry 136. The clock generation circuitry 126 and/or the clock generation circuitry 136 may be phased-locked loop (PLL) circuitry.

The re-timer device 140 transmits and receives signals to and from the end device 180. Accordingly, the re-timer device 110 is referred to as an end facing re-timer device. The re-timer device 140 receives the signal 185 from the end device 180, and generates and transmits the signal 165 from the received signal 151. The received signal 151 is received from the re-timer device 110 via the channel 102. In one or more examples, as will be described in greater detail in the following, the re-timer device 140 uses a two phase technique to extract a clock signal imbedded within the signal 151, recover the data within the signal 151, and transmit the signal 165 based on the data and the extracted clock signal. The signal 165 has reduced interference as compared to the signal 151. The signal 165 is output to the end device 180. Further, the re-timer device 140 receives the signal 185 from the end device 180, and uses a two phase technique as described in greater detail in the following to generate the signal 155 from the signal 185. The signal 155 is transmitted to the re-timer device 110 via the channel 102.

The re-timer device 140 includes transceiver circuitry 150 and transceiver circuitry 160. The transceiver circuitry 150 includes receiver circuitry 152, transmitter circuitry 154, and clock generation circuitry 156. The transceiver circuitry 160 includes receiver circuitry 162, transmitter circuitry 164, and clock generation circuitry 166. The clock generation circuitry 156 and/or the clock generation circuitry 166 includes PLL circuitry.

The receiver circuitry 122 receives the signal 171 from the transmitter circuitry 174 of the host device 170. The transmitter circuitry 134 generates and transmits the signal 135 based on the signal 171. The signal 131 is received by the receiver circuitry 132 from the channel 102. The transmitter circuitry 124 generates the signal 125 based on the signal 131.

The signal 135 is transmitted via the channel 102, and the signal 151 is received by the receiver circuitry 152. The signal 151 is the signal 135 include interference introduced by the channel 102. The transmitter circuitry 164 generates and transmits the signal 165 based on the signal 151. The signal 165 is received by the receiver circuitry 182 of the end device 180. The transmitter circuitry 184 transmits the signal 185, and the signal 185 is received by the receiver circuitry 162. The transmitter circuitry 154 generates and transmits the signal 155 based on the signal 185. The signal 155 is transmitted via the channel 102. The receiver circuitry 132 receives the signal 131. The signal 131 is the signal 155 with interference generated within the channel 102. The transmitter circuitry 124 generates and transmits the signal 125 based on the signal 131. The receiver circuitry 172 receives the signal 125 from the transmitter circuitry 124. Accordingly, data is transmitted from the host device 170 to the end device 180 via the communication device 100, and from the end device 180 to the host device 170 via the communication device 100.

In the re-timer device 110, the transceiver circuitry 120 may be referred to as host facing transceiver circuitry and the transceiver circuitry 130 may be referred to as backplane (e.g., channel) facing transceiver circuitry. In the re-timer device 140, the transceiver circuitry 150 may be referred to as backplane facing transceiver circuitry and the transceiver circuitry 160 may be referred to as end device facing transceiver circuitry.

As will be described in greater detail in the following, the clock generation circuitry 126 generates a clock signal for the receiver circuitry 122 and the transmitter circuitry 124 at least partially based on the signals 171 and 131. The clock generation circuitry 136 generates a clock signal for the receiver circuitry 132 and the transmitter circuitry 134 at least partially based on the signals 171 and 131. The clock generation circuitry 156 generates a clock signal for the receiver circuitry 152 and the transmitter circuitry 154 at least partially based on the signals 151 and 185. The clock generation circuitry 166 generates a clock signal for the receiver circuitry 162 and the transmitter circuitry 164 at least partially based on the signals 151 and 185.

The re-timer device 110, the re-timer device 140, the host device 170, and the end device 180 each have a corresponding reference clock signal with a tolerance limit with respect to a frequency based on a corresponding standard (or protocol), e.g., a standard frequency. Accordingly, the clock signal of the host device 170 has a frequency of Fhost, the clock signal of the re-timer device 110 has a frequency of Frth, the clock signal of the re-timer device 140 has a frequency Frtd, and the clock signal of the end device 180 has a frequency Fdevice. A tolerance of the differences between the frequencies Fhost, Frth, Frtd, and Fdevice is in respect to a standard frequency of a corresponding communication standard (or protocol). In one or more examples, maintaining the frequencies Fhost, Frth, Frtd, and Fdevice within a corresponding tolerance range by data rate matching between receiver and transmitter circuitries of the re-timer device 110 or 120 reduces data loss within the corresponding communication device 100.

In one example, the rate at which data of the signal 171 received by receiver circuitry 122 is proportional to the frequency Fhost. The transmitter circuitry 134 transmits data via the signal 135 at a rate proportional to frequency Frth. In one or more examples, to mitigate data loss and transmission gaps, the signal 135 is transmitted by the transmitter circuitry 134 at a rate proportional to Fhost. Data loss may occur in instances where the frequency Fhost is greater than the frequency Frth. Transmission gaps may occur in instances where the frequency Fhost is less than the frequency Frth. Accordingly, the frequency (e.g., transmit rate) of the transmitter circuitry 134 is adjusted to match the incoming data rate (e.g., frequency) at receiver circuitry 122. Further, the frequency (e.g., transmit rate) of the transmitter circuitry 124 is adjusted to match the frequency (e.g., incoming data rate) of the signal 131 at the receiver circuitry 132. In one or more examples, the frequency of the signal 171 at the receiver circuitry 122 and of the signal 131 at the receiver circuitry 132 may be different since in one direction the frequency is set by the host device 170, and in the other direction the frequency is set by the end device 180, and the frequency Fhost may differ from the frequency F device.

In one or more examples, in each transceiver circuitry 120, 130, 150, and 160, the frequency offset of the incoming signal (e.g., incoming data) is generated with respect to the local reference clock signal of the corresponding clock generation circuitry 126, 136, 156, and 166. In one example, the frequency offset is normalized by first transceiver circuitry and used by the clock generation circuitry of another transceiver circuitry to generate the clock signal for that transceiver circuitry. For example, the clock generation circuitry 136 generates a frequency offset based on the signal 131, which is used by the clock generation circuitry 126 to generate and transmit the signal 125 via the transmitter circuitry 124. Further, as will be described in more detail in the following, clock generation circuitry includes phase detector circuitry using a first-in-first-out (FIFO) scheme to determine the phase (and/or frequency) difference between a receive and transmit clock signal of respective transceiver circuitry. The phase detector circuitry filters and controls the frequency of the respective clock generation circuitry. Using phase detector circuitry with a FIFO scheme mitigates direct jumps in the frequency of clock generation circuitry, and also mitigates jumps in the frequency of a clock signal provided to transmitter circuitry or receiver circuitry connected to the clock generation circuitry. Further, in the transceiver circuitry, the use of the phase detector circuitry and FIFO circuitry allows of the frequency of the clock signal to be updated without external input.

Figure 2:
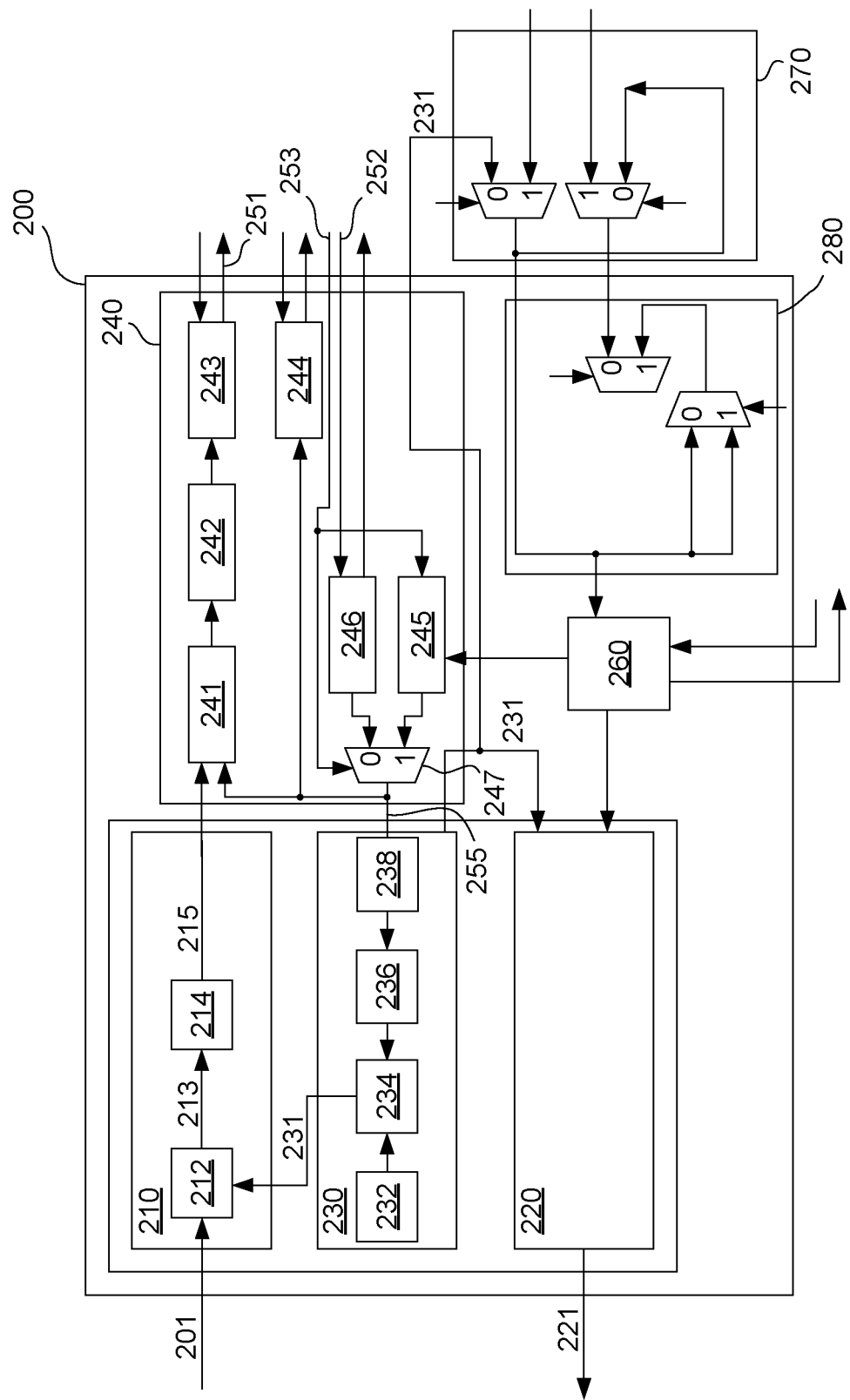
FIG. 2 illustrates a block diagram of a portion of a re-timer device.

FIG. 2 illustrates transceiver circuitry 200 of a re-timer device (e.g., the re-timer device 110 or 140 of FIG. 1), according to one or more examples. The transceiver circuitry 200 includes receiver circuitry 210, clock generation circuitry 230, transmitter circuitry 220, and frequency management circuitry 240.

The receiver circuitry 210 includes clock and data recovery (CDR) circuitry 212 and normalization circuitry 214 connected to the output of the CDR circuitry 212. In one example, the CDR circuitry 212 receives a signal 201 and determines a frequency offset signal 213 from the signal 201 with respect to a frequency of the clock signal 231 of the clock generation circuitry 230. The normalization circuitry 214 receives the frequency offset signal 213 and generates a frequency code (fcode) or parts per million (PPM) value 215 from the frequency offset signal 213. In other examples, measurements other than a PPM may be used to represent the frequency offset. The fcode is output from the receiver circuitry 210 and the frequency (e.g., rate) of the transmitter circuitry 220 is adjusted based on an fcode applied by the fcode adjustment circuitry 241 of the frequency management circuitry 240. The adjusted fcode is averaged by the averaging circuitry 242 and output by the fcode read management circuitry 243 as the receiver circuitry fcode signal 251. The receiver circuitry fcode signal 251 is output to the other transceiver circuitry of the corresponding re-timer device.

The frequency of the clock generation circuitry 230 (e.g., the frequency of the oscillator circuitry 232) is locked to a local reference clock signal (e.g., frequency locked to the local reference clock signal). Accordingly, an fcode of 0 is applied to the clock generation circuitry 230. In one or more examples, the frequency of the clock generation circuitry 230 is adjusted to match the frequency difference between the signal 201 and the frequency of the clock generation circuitry 230 (e.g., with respect to the local reference clock signal). In one or more examples, the frequency of the clock generation circuitry 230 is updated based on an updated fcode (e.g., signal 252) received from another transceiver circuitry. The updated fcode of the signal 252 is used to adjust the fcode of the signal 215 output from the receiver circuitry 210 by the fcode adjustment circuitry 241. Adjusting the fcode of the signal 215 compensates for any difference between the fcode of the signal 215 and the updated fcode and outputs a receiver circuitry fcode with respect to a primary function of the fcode adjustment circuitry 241. As is noted above, the adjusted fcode is averaged by the averaging circuitry 242 to mitigate noise and to improve accuracy. The averaged fcode is read out by the fcode read management circuitry 243.

In one or more examples, the clock generation circuitry 230 includes oscillator circuitry 232, phase mix (PMIX) circuitry 234, PMIX control circuitry 236, and de-normalization circuitry 238. The de-normalization circuitry 238 receives an fcode signal 255 from the frequency management circuitry 240. The fcode signal 255 is de-normalized by the de-normalization circuitry 238. The de-normalized fcode is applied to the PMIX circuitry 234 via the PMIX control circuitry 236 to modulate the frequency of the clock generation circuitry 230. Accordingly, the frequency of the clock generation circuitry 230 is offset by the fcode signal 255 with respect to the local reference clock signal of the clock generation circuitry 230.

The frequency management circuitry 240 includes fcode update management circuitry 244 that receives an fcode (e.g., via an fcode signal) from another transceiver circuitry of the corresponding re-timer circuitry. The fcode update management circuitry 244 converts the received fcode into a ramp with a programmable step size and update rate. Converting the received fcode into a ramp maintains the frequency jumps of the clock generation circuitry 230 to be within tolerance limits for the operation of the receiver circuitry 210 an the operation of the receiver circuitry of another transceiver of the corresponding re-timer device.

The frequency management circuitry 240 further includes loop filter circuitry 245 that determines (e.g., senses) the occupancy of the FIFO circuitry 260 in the transmit data path to determine the phase and/or frequency difference between the clock frequency of the clock generation circuitry 230 and the frequency of the signal 271 from the clock and data forwarding circuitry 270. In one example, a detected phase error is passed through the loop filter circuitry 245. The loop filter circuitry 245 includes a loop filter having proportional and integral gains to control the fcode of the clock generation circuitry 230 for determining phase and/or frequency differences between the clock frequency of the clock generation circuitry and the frequency of the signal 271.

The frequency management circuitry 240 further includes update management circuitry 246 that receives the fcode signal 252. The update management circuitry 246 generates an output signal based on the fcode signal 252 that determines whether or not an updated fcode value is received. The output of the update management circuitry 240 and the output of the loop filter circuitry 245 is received by the multiplexer 247. The multiplexer 247 is controlled via the track phase control signal 253 to select one of the output of the update management circuitry 246 and the output of the loop filter circuitry 245. The output of the update management circuitry 246 is selected during a first phase and the output of the loop filter circuitry 245 is selected during a second phase. The output of the multiplexer 247 is received by the de-normalizer circuitry 238.

The transmitter circuitry 220 receives the clock signal 231 from the clock generation circuitry 230. Further, the transmitter circuitry 220 receives the data signal from the FIFO circuitry 260. The FIFO circuitry 260 receives read and write clock signals. The FIFO circuitry 260 may function as a buffer between the read and write clock domains. The FIFO circuitry 260 provides data width conversion between the clock domains based on the operating data width and mode. The transmitter circuitry 220 generates the signal 221 based on the data signal from the FIFO circuitry 260 and the clock signal 231. The clock and data forwarding circuitry 270 and the clock and data selection circuitry 280 for a data path for clock signals and data signal to be received by the transceiver citrusy 200.

Figure 3:
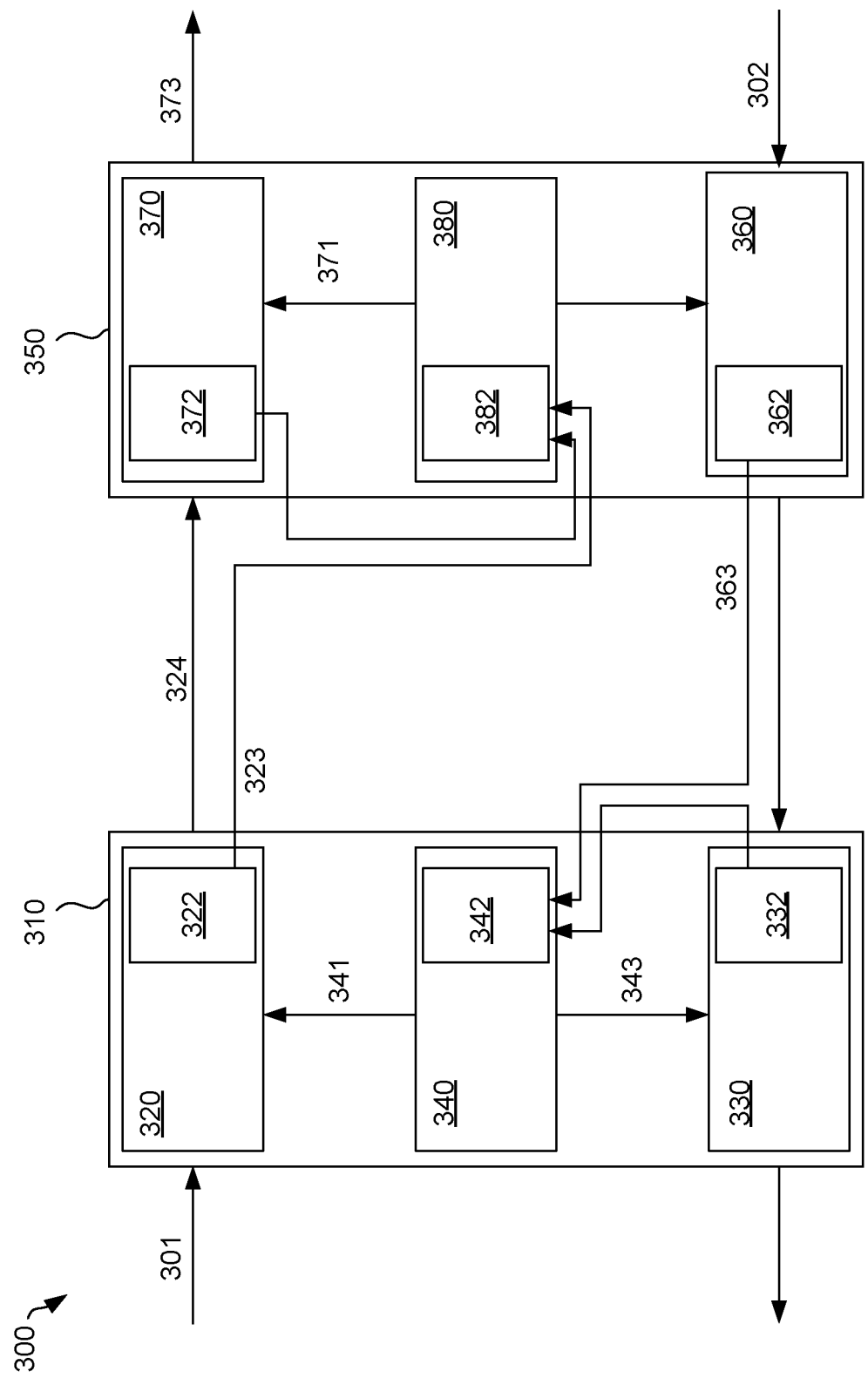
FIG. 3 illustrates a block diagram of a re-timer device.

The operation of the transceiver circuitry 200 is further described with regard to the re-timer device 300 of FIG. 3 and the tables 400, 402, and 404 of FIG. 4.

FIG. 3 illustrates the re-timer device 300, according to one or more examples. The re-timer device 300 includes transceiver circuitry 310 and transceiver circuitry 350. The transceiver circuitry 310 and the transceiver circuitry 350 are configured similar of the transceiver circuitry 200 of FIG. 2. The transceiver circuitry 310 includes receiver circuitry 320, transmitter circuitry 330, and clock generation circuitry 340. The receiver circuitry 320 includes CDR circuitry 322. The transmitter circuitry 330 includes FIFO circuitry 332. In one example, the FIFO circuitry 332 is external to the transmitter circuitry 330 and connected to the transmitter circuitry 330.

The transceiver circuitry 350 includes receiver circuitry 360, transmitter circuitry 370, and clock generation circuitry 380. The receiver circuitry 360 includes CDR circuitry 362. The transmitter circuitry 370 includes FIFO circuitry 372. In one example, the FIFO circuitry 372 is external to the transmitter circuitry 370 and connected to the transmitter circuitry 370.

The re-timer device 300 is operated during a setup phase and a tracking phase. The operation of the re-timer device 300 is described with reference to the tables 400, 402, and 404 of FIG. 4. FIG. 4 illustrates tables 400, 402, and 404 of the state status of the clock generation circuitry 340, the CDR circuitry 322, the clock generation circuitry 380, and the CDR circuitry 362 of FIG. 3, and corresponding codes and frequencies. The table 400 includes that states 410, 420, 430, 440, and 450 with corresponding statuses of the clock generation circuitry 340, the CDR circuitry 322, the clock generation circuitry 380, and the CDR circuitry 362. The table 402 includes that states 410, 420, 430, 440, and 450 with corresponding fcodes of the clock generation circuitry 340, the CDR circuitry 322, the clock generation circuitry 380, and the CDR circuitry 362. The table 404 includes that states 410, 420, 430, 440, and 450 with corresponding frequencies of the clock generation circuitry 340, the CDR circuitry 322, the clock generation circuitry 380, and the CDR circuitry 362.

A state 410, the transceiver circuitry 310 and the transceiver circuitry 350 of the re-timer device 300 are initialized. The state 410 corresponds with initializing the re-timer device 300. In one example, at the state 410, the clock generation circuitry 340 and the clock generation circuitry 380 are initially locked (e.g., frequency locked), and the CDR circuitry 322 and the CDR circuitry 362 are disabled. Disabling the CDR circuitry 322 and the CDR circuitry 362 omits the CDR circuitry 322 and the CDR circuitry 362 from performing corresponding clock signal and data signal recovery processes. Further at the state 410, the fcode of the clock generation circuitry 340, the fcode of the CDR circuitry 322, the fcode of the clock generation circuitry 380, and the fcode of the CDR circuitry 362 are 0. At state 410, the CDR circuitry 322 frequency is F3 (e.g., the frequency of the clock signal 341), the clock generation circuitry 340 frequency, the CDR circuitry 362 frequency, and the clock generation circuitry 380 frequency are F1.

In one or more examples, during the setup phase of the re-timer device 300, the CDR circuitry 322 of the receiver circuitry 320 performs fcode measurement of the signal 301 (e.g., a data stream) based on the reference clock signal 341 generated by the clock generation circuitry 340. The signal 310 has a frequency of F1. The reference clock signal 341 has a frequency of F3. In example, at the state 420 in tables 400, 402, and 404, the clock generation circuitry 340 is frequency locked, the CDR circuitry 322 is frequency locked, the clock generation circuitry 380 is frequency locked, and the code from the transceiver circuitry 310 is not transferred, and the CDR circuitry 362 status is disabled. Further, at the state 420, the CDR circuitry 322 fcode is F1-F3 (e.g., difference between the frequency of the signal 301 and the clock signal 341), and the clock generation circuitry 340 fcode, the CDR circuitry 362 fcode, and the clock generation circuitry 380 fcode are 0. The clock generation circuitry 340 fcode, the CDR circuitry 362 fcode, and the clock generation circuitry 380 fcode are 0 as the clock generation circuitry 340, the CDR circuitry 362 fcode, and the clock generation circuitry 380 have not received an updated fcode. Further at the state 420, the CDR circuitry 322 frequency is F1 (e.g., the frequency of the signal 301), and the clock generation circuitry 340, the clock generation circuitry 380, and the CDR circuitry 362 frequencies are F3 (e.g., the frequency of the clock signal 341).

The fcode measured by the CDR circuitry 322 is normalized to indicate the difference between frequencies F1 and F3, F1-F3. As the fcode of the clock generation signal is 0 to start (e.g., the state 410 of table 402), the difference between F1 and F3 is a first fcode of F1-F3, e.g., signal 323. The first fcode is averaged and output from the receiver circuitry 320. The receiver circuitry 320 further outputs the signal 324 generated from the signal 301. In one example, the receiver circuitry 320 receives the signal 301 and extracts the signal 324 from the signal 301, and outputs the signal 324. The transmitter circuitry 370 receives the data signal from the receiver circuitry 320.

The signal 323 representing the first fcode is received by the clock generation circuitry 380. The first fcode is applied to the clock generation circuitry 380 to generate and output the clock signal 371 having a frequency of F1. The clock signal 371 is used by the transmitter circuitry 370 to generate and transmit the signal 373 based on the signal (e.g., data signal) 324. Accordingly, the recovered clock frequency of the receiver circuitry 320 and the clock frequency of the transmitter circuitry 370 are the same, and errors within the re-timer device 300.

For example at state 430 of tables 400, 402, and 404, the clock generation circuitry 340 status and the CDR circuitry 322 status are frequency locked. The clock generation circuitry 380 status is frequency locked with the transceiver circuitry 310 fcode being transferred (e.g., the signal 323 representing the fcode F1-F3 is transmitted from the receiver circuitry 320 to the clock generation circuitry 380). Further, the CDR circuitry 362 status is disabled. At the state 430, the CDR circuitry 322 fcode is F1-F3 and the clock generation circuitry 380 fcode is F3-F1. The CDR circuitry 362 and the clock generation circuitry 340 fcodes are 0. The CDR circuitry 322 frequency is F1, the clock generation circuitry 380 frequency is F1, the CDR circuitry 362 frequency is F1, and the clock generation circuitry 340 frequency is F3.

At the state 440 of the tables 400, 402, and 404, the clock generation circuitry 340 status is frequency locked and the code from the transceiver circuitry 350 has not been transferred. The CDR circuitry 322 status is frequency locked, and the CDR circuitry 362 status is frequency locked. The clock generation circuitry 380 status is frequency locked and the transceiver circuitry 310 code has been transferred. Further, at state 440, the CDR circuitry 322 fcode is F1-F3, the clock generation circuitry 380 fcode is F3-F1, the CDR circuitry 362 fcode is F2-F1, and the clock generation circuitry 340 code is 0. The CDR circuitry 322 and the clock generation circuitry 380 frequencies are F1, the CDR circuitry 362 frequency is F2, and the clock generation circuitry 340 frequency is F3. The state 440 is part of a setup phase of the re-timer device 300.

Further, during the setup phase, the receiver circuitry 360 receives the signal 302 with a frequency of F2. As is described above, the frequency of the clock generation circuitry 380 is locked to the frequency F1. The CDR circuitry 362 of the receiver circuitry 360 determines a second fcode based on the difference between the frequencies F2 and F1 (e.g., F2-F1) post normalization. The second fcode is adjusted and averaged. Adjusting the second fcode compares the second fcode to the first fcode. Based on the first fcode having a value of F1-F3 and comparing the second code with the first code generates an adjusted second code having a value of F2-F3. The adjusted second fcode is averaged and output as the signal 363 to the clock generation circuitry 340.

At state the 450 of the tables 400, 402, and 404, the clock generation circuitry 340 status is frequency locked and the transceiver circuitry 350 fcode has been transferred via signal 363. The CDR circuitry 322 status and the CDR circuitry 362 status are frequency locked. The clock generation circuitry 380 status is frequency locked and the transceiver circuitry 310 fcode has been transferred as the signal 323. Further, at the state 450, the CDR circuitry 322 fcode is F1-F2, the clock generation circuitry 380 fcode is F3-F1, the CDR circuitry 362 fcode is F2-F1, and the clock generation circuitry 340 fcode is F3-F2. The CDR circuitry 322 frequency is F1, the clock generation circuitry 380 frequency is F1, the CDR circuitry 362 frequency is F2, and the clock generation circuitry 340 frequency is F2. Accordingly, the clock generation circuitry 340 and the CDR circuitry 362 operate at the frequency of the signal 302.

The clock generation circuitry 340 uses the adjusted second fcode of the signal 363 to output a clock signal 343 having the frequency F2. Accordingly, the frequency of the transmitter circuitry 330 and the receiver circuitry 360 are the same. Further, the CDR circuitry 362 of the receiver circuitry 360 remains at locked at the frequency F1 as the frequency of the clock signal 343 generated by the clock generation circuitry 340 is ramped slowly. In one or more examples, the CDR circuitry 362 outputs a third fcode of F1-F2. When adjusted by corresponding frequency adjustment circuitry (e.g., the frequency adjustment circuitry 240 of FIG. 2), and the fcode applied to the clock generation circuitry 380, the adjusted third fcode is (F1-F3). For example, the third fcode of F1-F2 is adjusted by the second fcode F2-F3 to generate the third fcode of F1-F3.

In one or more examples, the timing diagram of tables 400, 402, and 404 corresponds to a process to initialize the frequencies along the data path for two transceiver circuitries (e.g., transceiver circuitries 310 and 350 of FIG. 3) of a re-timing device (e.g. the re-timer device 300 of FIG. 3). Using the transceiver circuitry and re-timing circuitry as described above with regard to FIGS. 2 and 3 allows receiver circuitry and transmitter circuitry of two different transceivers to operate at the same frequency. For example, as is illustrated by FIG. 4 at state 450, the clock generation circuitry 340 provides a clock signal to the transmitter circuitry 330 having the same frequency as that of the receiver circuitry 360 (e.g., the CDR circuitry 362 frequency). Further, as is illustrated by FIG. 4, at state 450, the clock generation circuitry 380 provides a clock signal to the transmitter circuitry 370 having the same frequency as that of the receiver circuitry 320 (e.g., CDR circuitry 322 frequency).

In one or more examples, the above processes as described with regard to FIG. 3 and FIG. 4 may be repeated to compensate for drift within the frequencies F1 and F2 to improve the accuracy of the determined frequencies. Further, the above processes may be referred to as a set-up phase or initialization process.

After the set-up phase, the frequencies of the clock generation circuitry 340 and the clock generation circuitry 380 is tracked during a tracking phase. During a tracking phase the frequencies may be adjusted based on the frequencies of the signals received by the receiver circuitry 320 and/or receiver circuitry 360. The tracking phase maintains the write and read clock signals of the FIFO circuitry 332 and FIFO circuitry 372 within a tolerance limit of the FIFO circuitries 332 and 352 and corresponding processing loops as defined by the corresponding communication standard or protocol. During the tracking process, phase detector circuitry 342 of the clock generation circuitry 340 and phase detector circuitry 382 of the clock generation circuitry measure error between write and read clock signals of FIFO circuitry 332 and FIFO circuitry 372, respectively. In one example, the write and read clock signals of the data path from receiver circuitry 320 to the transmitter circuitry 370 correspond to the recovered clock for the receiver circuitry 320 and the clock signal of transmitter circuitry 370 at frequency F1. Further, the write and read clock signals of the data path from the receiver circuitry 360 to the transmitter circuitry 330 correspond to the recovered clock for receiver circuitry 360 and the clock signal of the transmitter circuitry 330 at frequency F2.

The phase error determined by the phase detector circuitry 342 is used to manipulate (e.g., increase or decrease) the fcode of the clock generation circuitry 340. For example with reference to FIG. 2, the phase difference is output to the loop filter circuitry 245, which generates and updated fcode for the clock generation circuitry 340. Further, the phase error determined by a phase detector of the clock generation circuitry 380 is used to manipulate the fcode of the clock generation circuitry 380.

Figure 5:
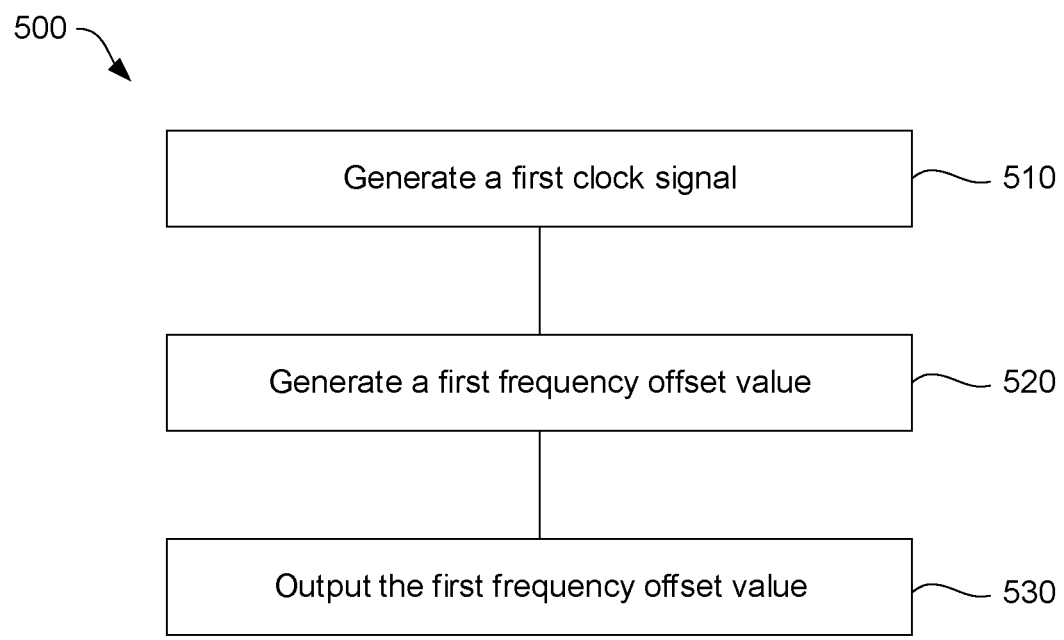
FIG. 5 illustrates a flowchart of a method for generating a frequency offset value.

FIG. 5 illustrates a flowchart of a method 500 for generating frequency offset values, according to one or more examples. The method 500 is performed by the re-timer device 300 of FIG. 3. At 510, a first clock signal is generated. For example, with reference to FIG. 3, the clock generation circuitry 340 generates the clock signal 341. The clock signal 341 has a frequency of F1.

At 520, a first frequency offset value is generated. With reference to FIG. 3, the CDR circuitry 322 generates a first frequency offset value based on a frequency (e.g., F2) of the signal 301 and the frequency F1 of the clock signal 341. In one example, the CDR circuitry 322 determines a difference between the frequency F2 and the frequency F1.

At 530, the first frequency offset value is offset. With reference to FIG. 3, the receiver circuitry 320 outputs the first frequency offset value to the clock generation circuitry 380 of the transceiver circuitry 350. The clock generation circuitry 380 generates the clock signal 371 based on the first frequency offset value. The clock signal 371 is output to the transmitter circuitry 370. The transmitter circuitry 370 further receives the signal 324, and generates and outputs a first output signal based on the signal 324 and the clock signal 371. The transmitter circuitry 370 outputs the first output signal having the same frequency as the signal 301.

Figure 6:
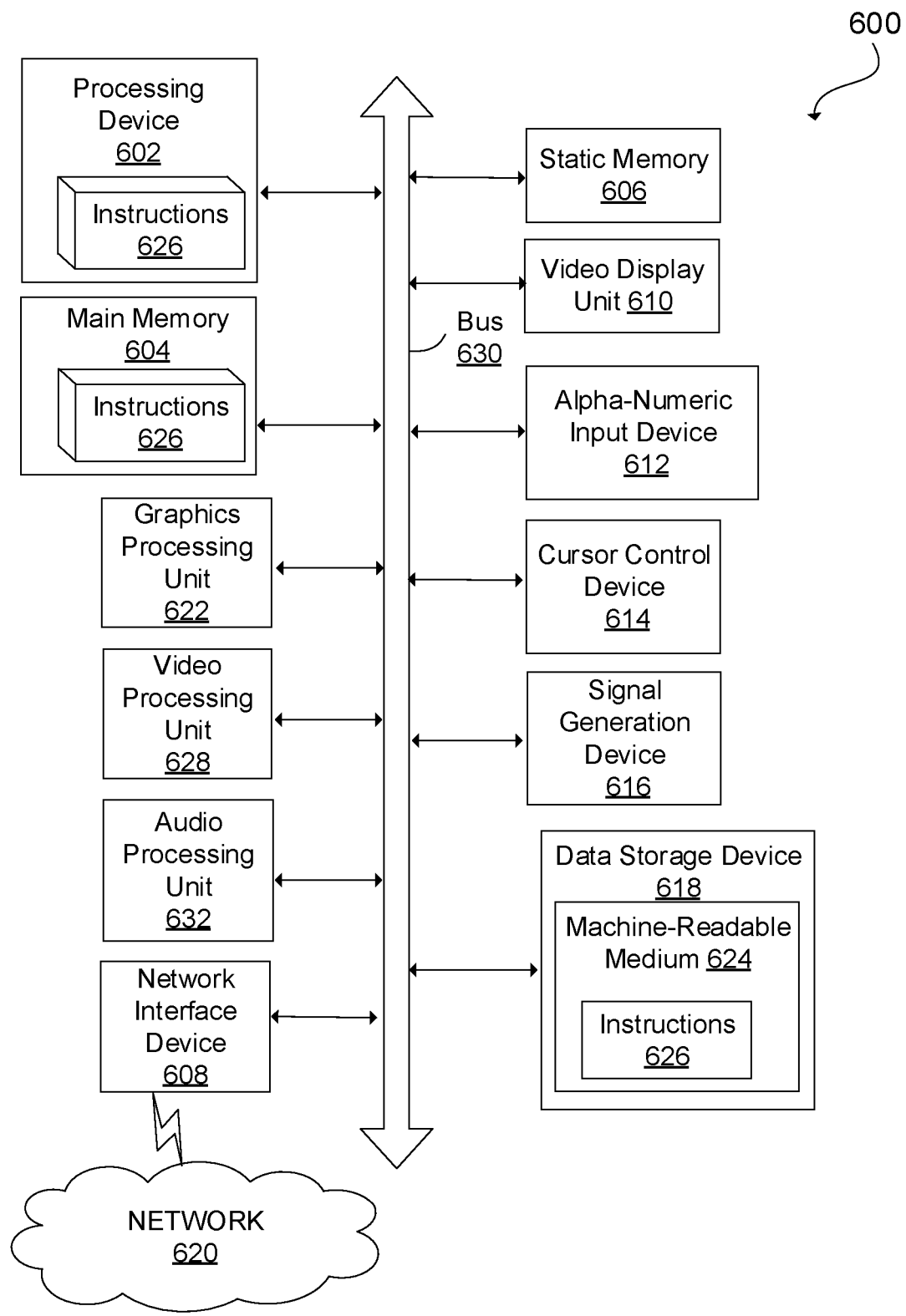
FIG. 6 depicts a diagram of an example computer system in which embodiments of the present disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A transceiver circuitry comprising:
   clock generation circuitry configured to generate a first clock signal; and
   first receiver circuitry configured to:
     receive the first clock signal and a first input signal;
     generate a first frequency offset value based on the first input signal and the first clock signal, wherein the first input signal has a first frequency and the first clock signal has a second frequency different than the first frequency; and
     output the first frequency offset value.

2. The transceiver circuitry of claim 1, wherein the clock generation circuitry is further configured to:
   receive a second frequency offset value; and
   generate a second clock signal having a third frequency based on the second frequency offset value, and wherein the transceiver circuitry further comprises first transmitter circuitry configured to output a first output signal having the third frequency.

3. The transceiver circuitry of claim 2, wherein the first receiver circuitry is further configured to generate a third frequency offset value based on the first frequency offset value and the second frequency offset value.

4. The transceiver circuitry of claim 2, wherein the second frequency offset value is received from second receiver circuitry of another transceiver circuitry.

5. The transceiver circuitry of claim 1 configured to receive a clock adjustment signal from a second transceiver circuitry and generated based on a fourth frequency of a third clock signal and a frequency of a second input signal, and output a fourth clock signal based on the clock adjustment signal.

6. The transceiver circuitry of claim 1, wherein the first receiver circuitry comprises clock and data recovery circuitry configured to operate at the first frequency offset value based on the first receiver circuitry receiving the first input signal.

7. The transceiver circuitry of claim 1, wherein the clock generation circuitry comprises phase detector circuitry configured to adjust a frequency code of the clock generation circuitry based on read clock signals and write clock signals.

8. A re-timer device comprising:
   first transceiver circuitry configured to:
     generate a first clock signal;
     generate a first frequency offset value based on a first input signal and the first clock signal, wherein the first input signal has a first frequency and the first clock signal has a second frequency different than the first frequency; and
     output the first frequency offset value; and
   second transceiver circuitry configured to:
     receive the first frequency offset value; and
     output a first output signal based on the first frequency offset value and the first input signal.

9. The re-timer device of claim 8, wherein the first transceiver circuitry is further configured to:
   receive a second frequency offset value from the second transceiver circuitry; and
   generate a second clock signal having a third frequency based on the second frequency offset value, and wherein the first transceiver circuitry further comprises first transmitter circuitry configured to output a first output signal having the third frequency.

10. The re-timer device of claim 9, wherein the first transceiver circuitry is further configured to generate a third frequency offset value based on the first frequency offset value and the second frequency offset value.

11. The re-timer device of claim 9, wherein the second transceiver circuitry is further configured generate the second frequency offset value based on the first frequency offset value and a frequency of a second input signal.

12. The re-timer device of claim 11, wherein the first transceiver circuitry is configured to output a second output signal based on the second frequency offset value and the second input signal.

13. The re-timer device of claim 8, the first transceiver circuitry is configured to receive a clock adjustment signal from the second transceiver circuitry and generated based on a comparison of a fourth frequency of a third clock signal and a frequency of a second input signal, and output a fourth clock signal based on the clock adjustment signal.

14. The re-timer device of claim 8, wherein the first transceiver circuitry comprises clock and data recovery circuitry configured to operate at the first frequency offset value based on receiving the first input signal.

15. The re-timer device of claim 8, wherein the first transceiver circuitry is further configured to adjust a frequency of clock generation circuitry of the first transceiver circuitry based on read clock signals and write clock signals of one or more FIFO circuitries.

16. A method comprising:
generating a first clock signal;
receiving a first input signal;
generating, via first transceiver circuitry, a first frequency offset value based on the first input signal and the first clock signal, wherein the first input signal has a first frequency and the first clock signal has a second frequency different than the first frequency; and
outputting the first frequency offset value.

17. The method of claim 16 further comprising:
receiving a second frequency offset value; and
generating a second clock signal having a third frequency based on the second frequency offset value.

18. The method of claim 17 further comprising:
generating a third frequency offset value based on the first frequency offset value and the second frequency offset value.

19. The method of claim 17 further comprising:
receiving a clock adjustment signal, the clock adjustment signal is generated based on a fourth frequency of a third clock signal and a frequency of a second input signal.

20. The method of claim 16 further comprising adjusting a frequency of clock generation circuitry of the first transceiver circuitry based on read clock signals and write clock signals.

* * * * *